March 27, 1928.  
T. A. CONLON  
1,663,796  
MOUNT FOR GUNS  
Filed Feb. 10, 1926  
2 Sheets-Sheet 1
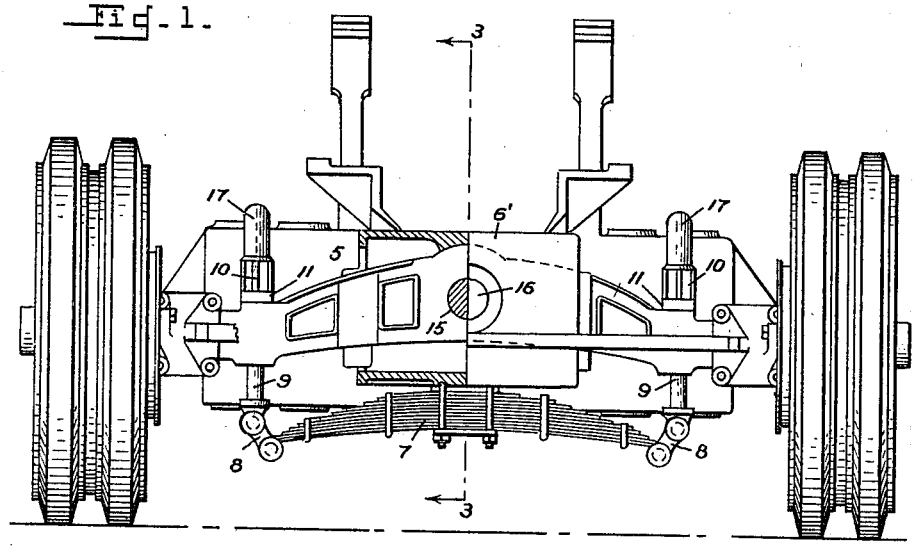
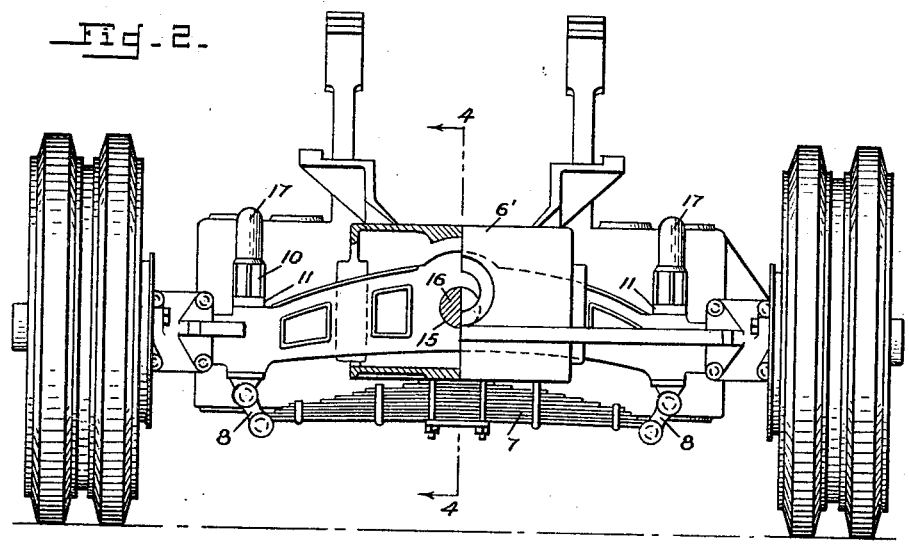
Inventor  
Thomas A. Conlon  
By W. N. Roach  
Attorney March 27, 1928. 1,663,796
T. A. CONLON
MOUNT FOR GUNS
Filed Feb. 10, 1926  2 Sheets-Sheet 2
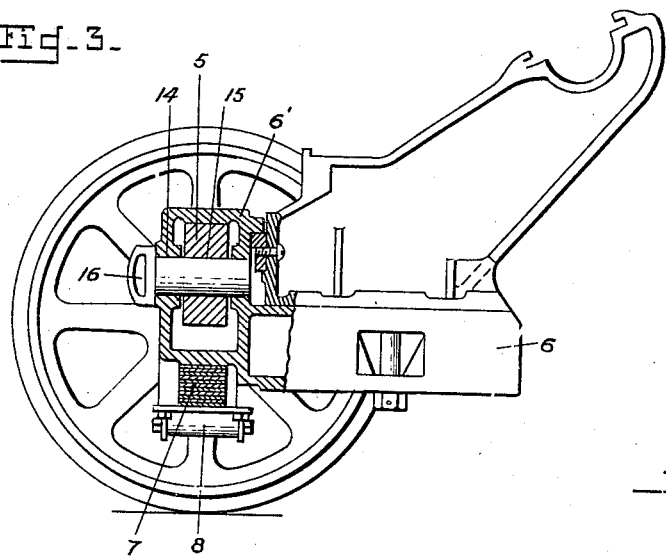
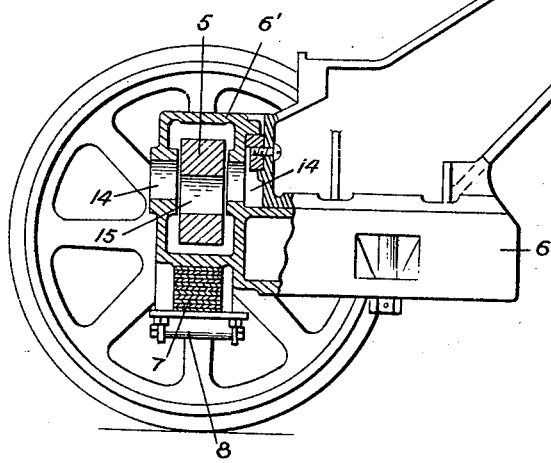
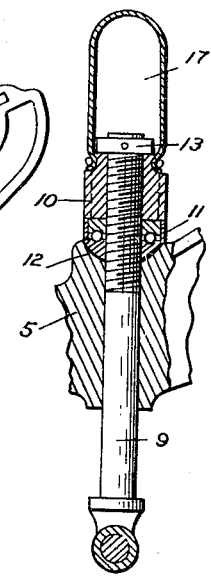
Inventor
Thomas A. Conlon
By W. M. Road
Attorney Patented Mar. 27, 1928.

1,663,796

UNITED STATES PATENT OFFICE.

THOMAS A. CONLON, OF SILVER SPRING, MARYLAND.

MOUNT FOR GUNS.

Application filed February 10, 1926. Serial No. 87,458.

(GRANTED UNDER THE PROVISIONS OF THE ACT OF MARCH 3, 1883, 22 STAT. L., 625.)

The invention described herein may be used by the Government, or any of its officers or employees in prosecution of work for the Government, or by any other person in the United States, without payment to me of any royalty thereon, in accordance with the act of March 3, 1883.

This invention relates to mount for guns.

In the construction of wheeled gun mounts it is desirable that the lower carriage be connected to the axle in such a manner that the mount may travel over rough ground without injurious shocks and strains and that the connection may be rendered comparatively rigid and free from vibration when the gun is in the firing position.

In the traveling position the carriage is hung from the axle by means of suitable springs but for firing the weight of the carriage must be relieved from the springs and a rigid or semi-rigid connection established, usually by passing a pin through the axle and the carriage. This operation necessitates the employment of jacks and also involves unshackling the springs.

In order to reduce the time required in converting the mount from one position of adjustment to the other the present invention contemplates an axle having self-contained jacks to which the ends of the springs are attached.

To these and other ends, my invention consists in the construction, arrangement and combination of elements, described hereinafter and pointed out in the claims forming a part of this specification.

A practical embodiment of the invention is illustrated in the accompanying drawings, wherein:

Fig. 1 is a front view in elevation and partly in section of a wheeled gun mount constructed in accordance with the invention and showing the carriage in the firing position;

Fig. 2 is a similar view showing the carriage in the traveling position;

Fig. 3 is a sectional view on the line 3—3 of Fig. 1;

Fig. 4 is a similar view on the line 4—4 of Fig. 2;

Fig. 5 is an enlarged sectional view of one of the jacks.

Referring to the drawings by numerals of reference:

The gun mount includes an axle 5 which passes within a housing 6' at the forward portion of the bottom carriage 6 and which is capable of both lateral and vertical movement with respect thereto.

The carriage is resiliently connected to the axle by being mounted on a semi-elliptic spring 7 whose ends are connected by the shackles 8 to the lower extremities of jacks 9 passing vertically through the axle and engaged by nuts 10 on the upper side thereof. The nuts are seated on anti-friction bearings 11 to facilitate operation of the jacks and the lower races of the bearings are preferably spherical as shown at 12 to provide for slight adjusting movement and insure an even distribution of the load. A collar 13 pinned on the jack is positioned thereon to contact the nut 10 when apertures 14—14 in the front and rear plates of the housing 6' are alined with an aperture 15 in the axle. In this position an axle pivot pin 16 may be inserted in the apertures 14 and 15 and the mount is ready for firing.

Dust caps 17 are secured to the nuts 10 for an obvious purpose.

In preparing a mount for firing it is only necessary to turn the nuts 10 and lower the bottom carriage into position to receive the pivot pin 16, the procedure being reversed in restoring the mount to traveling position.

While in the foregoing there has been illustrated and described such combination and arrangement of elements as constitute the preferred embodiment of my invention, it is nevertheless desired to emphasize the fact that interpretation of the invention should only be conclusive when made in the light of the subjoined claims.

I claim:

1. A wheeled gun mount including a bottom carriage, an axle housing formed on the carriage and provided with apertures, an axle loosely mounted in the housing and provided with an aperture, a semi-elliptic spring secured to the carriage, jacks mounted vertically in the axle, shackles for securing the jacks to the ends of the spring, a nut on the upper end of each jack, a bearing having a spherical seat interposed between each nut and the axle, and means insertable in the apertures of the carriage and axle for rigidly connecting the carriage to the axle.

2. A wheeled gun mount including a bottom carriage, an axle housing formed on the carriage and provided with apertures, an axle loosely mounted in the housing and provided with an aperture, a spring secured to the carriage, jacks mounted vertically in the axle, shackles for securing the jacks to the ends of the spring, a bearing interposed between each jack nut and the axle and means inserable in the apertures of the carriage and axle for rigidly connecting the carriage to the axle.

3. A wheeled gun mount including a bottom carriage provided with apertures, an axle formed with an aperture adapted to align with the apertures of the carriage, jacks mounted vertically in the axle, a resilient connection secured to the carriage and the jacks, and a pin insertable in the apertures in the carriage and axle when said apertures are alined through operation of the jacks.

4. A gun mount including a carriage, an axle, jacks mounted vertically in the axle and a resilient connection between the carriage and jacks.

5. A gun mount including a carriage, an axle, jacks mounted in the axle and a resilient connection between the carriage and jacks.

6. A gun mount including a carriage, an axle, means for rigidly connecting the carriage and axle, a resilient suspension for the carriage, and means connecting said suspension to the axle and providing for movement of the carriage with respect to the axle.

7. A gun mount including a carriage, an axle, a resilient suspension for the carriage and means connecting the suspension to the axle and providing for movement of the carriage with respect to the axle.

THOS. A. CONLON.